US009182420B2

(12) United States Patent  (10) Patent No.: US 9,182,420 B2
Melde et al.  (45) Date of Patent: Nov. 10, 2015

(54) PHASE-CHANGE ENABLED FLOW FIELD VISUALIZATION

(71) Applicant: Palo Alto Research Center Incorporated, Palo Alto, CA (US)

(72) Inventors: Kai Melde, San Francisco, CA (US); Philipp H. Schmaelzle, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/834,551

(22) Filed: Mar. 15, 2013

(65) Prior Publication Data

US 2014/0264080 A1  Sep. 18, 2014

(51) Int. Cl.
*F21V 9/16* (2006.01)
*G01P 5/00* (2006.01)

(52) U.S. Cl.
CPC ...................................... *G01P 5/001* (2013.01)

(58) Field of Classification Search
CPC ............... G01N 33/54333; G01N 2021/4769; G01N 2021/7786; G01N 21/05; G01N 21/53; G01P 5/001
USPC ..................................................... 250/459.1
See application file for complete search history.

(56) References Cited

U.S. PATENT DOCUMENTS

| | | | |
|---|---|---|---|
| 4,919,536 A | 4/1990 | Komine | |
| 5,002,389 A | 3/1991 | Benser | |
| 5,011,278 A | 4/1991 | Farrell | |
| 5,124,071 A | 6/1992 | Katz | |
| 5,229,041 A * | 7/1993 | Katz | ................ 264/13 |
| 5,430,104 A | 7/1995 | Siol et al. | |
| 5,532,814 A | 7/1996 | Cha | |
| 5,979,245 A * | 11/1999 | Hirano et al. | ............... 73/861.05 |
| 6,276,217 B1 * | 8/2001 | Hirano et al. | ............... 73/861.05 |
| 6,491,061 B1 * | 12/2002 | Lopez et al. | ............. 137/599.01 |
| 6,496,262 B1 | 12/2002 | Meng et al. | |
| 6,549,274 B1 * | 4/2003 | Arndt et al. | ...................... 356/28 |
| 6,653,651 B1 * | 11/2003 | Meinhart et al. | ............... 250/573 |
| 6,700,652 B2 * | 3/2004 | Chao et al. | ...................... 356/28 |
| 6,879,708 B2 | 4/2005 | Wernet et al. | |
| 6,940,888 B2 * | 9/2005 | Liu | ................................ 372/97 |
| 7,115,255 B2 | 10/2006 | L'Alloret | |
| 7,227,621 B2 | 6/2007 | Lee et al. | |
| 7,283,215 B2 * | 10/2007 | Wang et al. | ...................... 356/28 |
| 7,572,640 B2 * | 8/2009 | Goix et al. | ..................... 436/172 |
| 7,652,100 B2 | 1/2010 | L'Alloret | |
| 7,655,702 B2 | 2/2010 | L'Alloret | |
| 7,722,859 B2 | 5/2010 | L'Alloret | |
| 7,787,106 B2 | 8/2010 | Ilev et al. | |
| 7,883,692 B2 | 2/2011 | L'Alloret | |

(Continued)

*Primary Examiner* — David J Makiya
*Assistant Examiner* — Taeho Jo
(74) *Attorney, Agent, or Firm* — Fay Sharpe LLP

(57) ABSTRACT

A system and method for visualization of fluid flow, includes a light emitting arrangement configured to emit a focused light, a fluid channel configured to hold a fluid including a carrier liquid and a stimuli responsive polymer, wherein the fluid flows though the fluid channel, and an image recording arrangement. The light emitting arrangement is positioned to emit the focused light into a selected area of the fluid channel to interact with the flowing stimuli responsive polymer within the selected area. This results in a phase change to a portion of the stimuli responsive polymer. The image recording arrangement is positioned to record an image the portion of the phase changed stimuli responsive polymer made visible by the phase change.

20 Claims, 3 Drawing Sheets

(56) References Cited

U.S. PATENT DOCUMENTS

| | | | |
|---|---|---|---|
| 7,912,274 B2* | 3/2011 | Rigler et al. | 382/141 |
| 8,358,463 B2 | 1/2013 | Jaw et al. | |
| 8,462,339 B2* | 6/2013 | Livingston | 356/337 |
| 2001/0040214 A1* | 11/2001 | Friedman et al. | 250/287 |
| 2002/0039737 A1* | 4/2002 | Chan et al. | 435/6 |
| 2002/0188084 A1* | 12/2002 | Ohnishi et al. | 526/148 |
| 2006/0127925 A1* | 6/2006 | Stayton et al. | 435/6 |
| 2008/0015440 A1 | 1/2008 | Shandas | |
| 2008/0245964 A1* | 10/2008 | Miles et al. | 250/288 |
| 2010/0159019 A1* | 6/2010 | Yang et al. | 424/497 |
| 2010/0255581 A1* | 10/2010 | Naqvi et al. | 435/396 |
| 2011/0003154 A1* | 1/2011 | Ghyzel et al. | 428/402 |
| 2011/0003392 A1* | 1/2011 | Stayton et al. | 436/86 |
| 2011/0025826 A1 | 2/2011 | Dabiri | |
| 2011/0137404 A1* | 6/2011 | Whirley et al. | 623/1.13 |
| 2011/0152978 A1* | 6/2011 | Dacey et al. | 607/92 |
| 2011/0159272 A1* | 6/2011 | Yue et al. | 428/315.5 |
| 2011/0256085 A1* | 10/2011 | Talingting Pabalan et al. | 424/70.13 |
| 2012/0065614 A1* | 3/2012 | Omary et al. | 604/500 |
| 2012/0105628 A1 | 5/2012 | Fukuchi | |
| 2012/0237104 A1 | 9/2012 | Fouras | |
| 2014/0037830 A1* | 2/2014 | Sexton et al. | 426/648 |

* cited by examiner

PHASE-CHANGE ENABLED FLOW FIELD VISUALIZATION

BACKGROUND

To verify fluid dynamic simulations, flow fields can be visualized by particle image velocimetry (PIV), an instrument relied upon by industrial research in fluid dynamics contexts. In PIV, sequential images of particles seeded into the flow field for this purpose are correlated to obtain vector fields which represent the flow. Proper particle seeding, which is often meticulously tweaked empirically, is necessary to receive good results.

A solution which does not require seed particles is desirable. This being particularly useful for complex channel geometries with strongly differing flows in different regions, as in these situations it may be infeasible to find a particle seeding that satisfies the constraints on particle concentration in all regions simultaneously.

BRIEF DESCRIPTION

A system and method for visualization of fluid flow, includes a light emitting arrangement configured to emit a focused light, a fluid channel configured to hold a fluid including a carrier liquid and a stimuli responsive polymer, wherein the fluid flows though the fluid channel, and an image recording arrangement. The light emitting arrangement is positioned to emit the focused light into a selected area of the fluid channel to interact with the flowing stimuli responsive polymer within the selected area. This results in a phase change to a portion of the stimuli responsive polymer. The image recording arrangement is positioned to record an image the portion of the phase changed stimuli responsive polymer made visible by the phase change.

DETAILED DESCRIPTION

Figure 1:
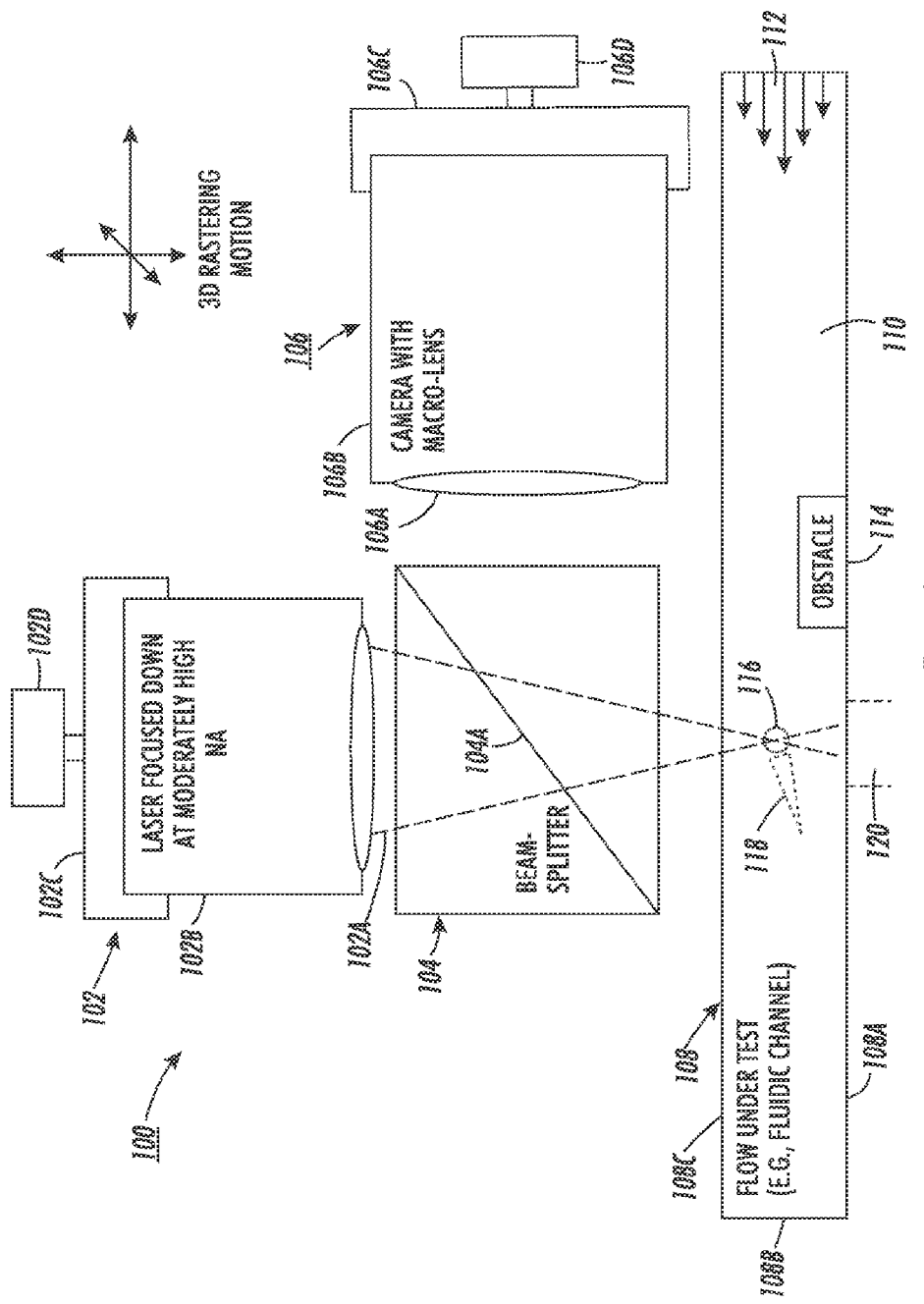
FIG. 1 is an embodiment of a system incorporating the presently described concepts.

With reference to FIG. 1, illustrated is a system 100 which provides phase changed enabled flow field visualization that does not require the use of seed particles being located within the fluid flow. System 100 includes a light emitting arrangement 102 configured to emit a focused light 102a from a light emitting device 102b. In one embodiment light emitting device 102b may be a laser, where the particular laser is one of a number of known lasers, such as but not limited to infrared lasers, red lasers, and others. Light emitting arrangement 102 is also shown to include a movable base 102c, whose movement is controlled by a base controller 102d.

A beam splitter 104 is positioned in the path of the focused light 102a, such that the focused light 102a passes though the beam splitter 104.

Next an image recording system 106 is depicted positioned in relation to the beam splitter such that lens 106a of the image recording device 106b is directed towards angled one sided mirror 104a of beam splitter 104. The image recording device 106b may be a camera, such as CCD camera, or other device able to take single, multiple as well as video images. Image recording system 106 is also shown to include a movable base 106c, designed to automatically move the imaging device 106b to multiple positions in accordance with software commands or user instructions issued by a base controller 106d.

System 100 further includes a fluid channel 108 having a bottom base 108a, sidewalls 108b, and top cover 108c, configured to hold fluid 110. While fluid channel 108 is illustrated as an enclosed channel, the concepts of the present application can, in certain embodiments, be employed in an open channel configuration, where there is no enclosing top portion.

In FIG. 1 fluid flow 112 of fluid 110 is shown to be flowing in a direction from right to left on the page. An obstacle 114 is positioned within the fluid channel 108 to provide a non-straight path for fluid flow, where obstacle 114 is intended to illustrate the present concepts are applicable to complex channel geometries having other than a straight line fluid flow.

In the present embodiment fluid 110 in the fluid channel 108 includes a carrier liquid (e.g., water or other liquid of interest) and a stimuli responsive material, such as a stimuli responsive polymer which is dissolved in the carrier liquid. One stimuli responsive polymer appropriate for the present concepts is a LCST polymer, Poly-NiPAAm. A particular characteristic of this polymer is that it is dissolvable in a variety of liquids, which in certain embodiments, means that prior to implementing various steps of the present concepts when the carrier liquid fluid is water or other transparent liquid, the flowing fluid 110 in fluid channel 108 is transparent.

The present system 100 uses the dissolved transparent stimuli responsive polymer and carrier liquid mixture as the flowing fluid 110, such that any volume element in this fluid can be radiatively stimulated (heated) to make the stimuli responsive polymer visible, such as by scattering. In this description visible means to include being visible within a spectral range visible to the human eye.

More particularly to the above and as shown in FIG. 1, focused light 102a passes though the beam-splitter 104 and the top cover 108c of the fluid channel 108 into the transparent fluid 110 at a very compact selected area (e.g., a 3D focal zone) 120, for example as a spot approximately 40 to 100 microns in diameter, and more preferably approximately 50 microns in diameter. By this arrangement the focused light 102a, creates sufficient heating in the stimuli responsive polymer (e.g. aqueous solutions of the LCST polymer Poly-NiPAAm), only within the selected area 120 of fluid channel 108.

This heating action triggers a phase change to at least a portion of the stimuli responsive polymer. More particularly, the stimuli responsive polymer is normally in a hydrophilic state, however when it is heated to a critical temperature, in one embodiment approximately 32 degrees Celsius, the stimuli responsive polymer undergoes a phase change and becomes hydrophobic. As this occurs the structure of the stimuli responsive polymer within the fluid 110 collapses, creating a light scattering section that appears as a visible (in some embodiments a "milky" or white) film.

The stimuli responsive polymer in the phase changed state is shown as spot 116 in FIG. 1. Then over the passage of some time period and due to the fluid flow 112 within fluid channel 108, spot 116 changes into a visible streak 118. It is to be appreciated that both spot 116 and visible streak 118 are shown in FIG. 1 for teaching purposes. An alternative understanding of both spot 116 and streak 118 being shown in the same figure are that they represent two separate phase changes of the transparent stimuli responsive polymer. In other words, the laser 102 has operated twice with an off period between operations. Also, while FIG. 1 shows streak 118 as a substantially straight streak, the present concepts are applicable for visualization of complex channel geometries which are capable of producing streaks that are in other forms, including vortex, helical and other shapes.

The visible spot 116 and/or visible streak 118 are recorded by camera 106b. More particularly camera 106b is positioned where mirror 104a of the beam splitter 104 is used to direct the viewing area of lens 106a to the same selected area (or 3D focal zone) where the focused light 102a interacts with the fluid (having the dissolved transparent stimuli responsive polymer) 110. Prior to phase change, the focused beam 102a passes through the fluid 110 and does not reflect back in a detectable manner. However after the phase change occurs a portion of the fluid 110 has a film (e.g., in some embodiments a milky or white film), and when the focused beam impinges on this location (e.g., spot 116 and streak 118) this section of beam 102a is scattered or reflected back off that portion of the surface and is detected at the lens 106a of camera 106b. As can be seen from the drawings, the area of coverage by the camera 106b is much greater than the size of beam 102b that heats the portion of the stimuli responsive polymer the changes phase.

In one embodiment camera 106b captures the visual images in accordance with a 3D rastering motion, which may be any of a number of known software controlled processes, where the movement of camera 106b is accomplished by use of the movable automatically controllable base 106c and base controller 106d. The described method thereby performs rastering through all locations in xyz-space. Particularly the addressability in the z coordinate (axial to observation) allows highly flexible interrogation of the full volumetric flow field. In state of the art PIV-systems such z-resolution is typically realized by providing a fan-like laser sheet orthogonal to the viewing direction to selectively illuminate tracer particles in its plane.

The method undertaken within system 100 of FIG. 1 relies on transmission of the stimulation light (e.g., focused light 102a) through all window and other structures (e.g., top 108c of channel 108), and on absorption of the focused light 102a in the bulk of the media (e.g., fluid 110). Typical materials which are used for construction of fluid channel 108 designed to hold a suitable transparent stimuli responsive polymer (e.g., Poly-NiPAAm) include acrylics and silicones.

Figure 2:
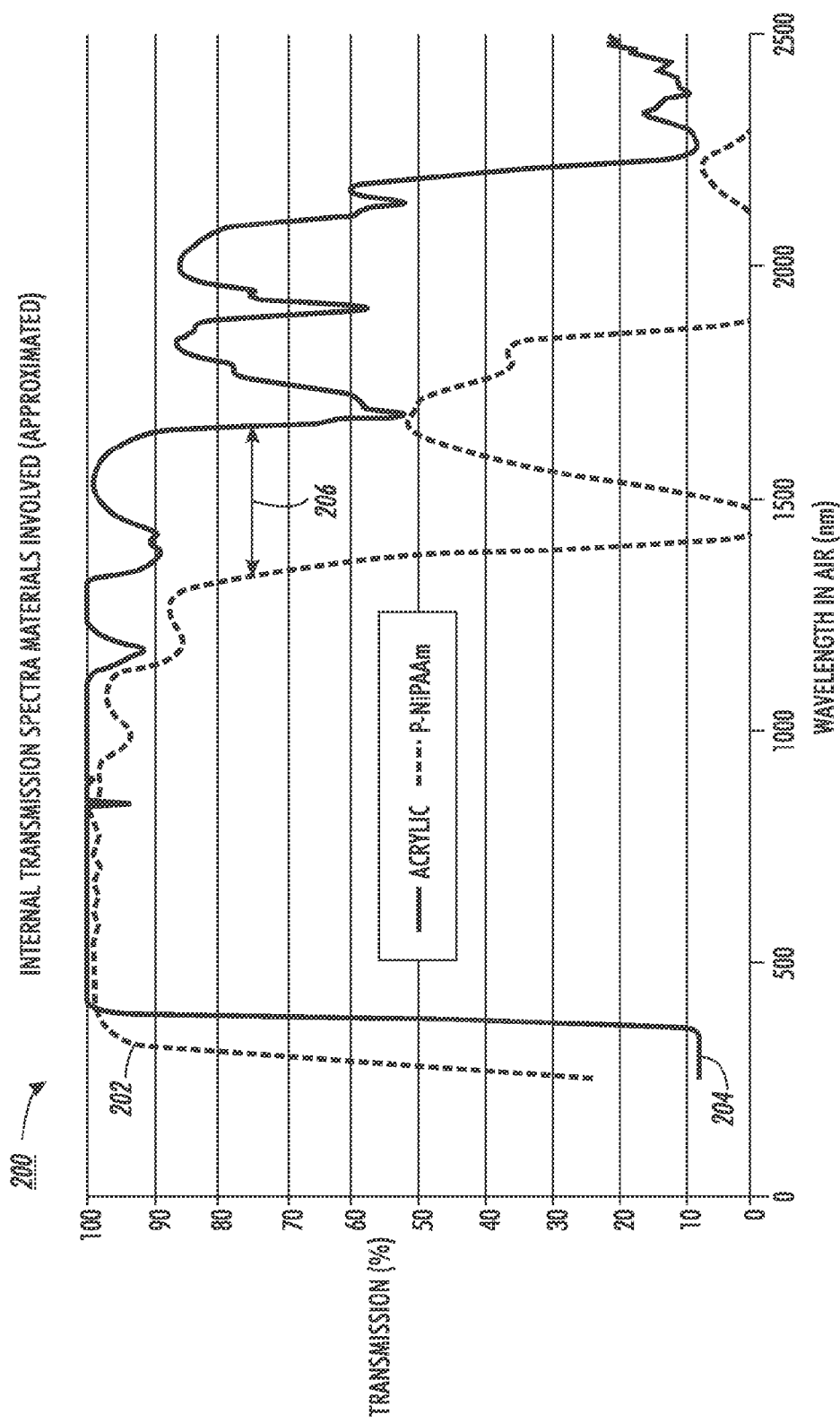
FIG. 2 illustrates internal transmission spectra of acrylic and a stimuli responsive material.

FIG. 2 illustrates a chart 200 depicting exemplary transmission spectra for acrylic 202 and Poly-NiPAAm 204. The chart 200 identifies a spectral region 206 from approximately 1400 to approximately 1600 nm with strong absorption in the P-NiPAAm and good transmission through acrylics, indicating a light emitting device operating within this range would be favorable as an illuminant wavelength.

It is understood however that it may be desired to use a light emitting device such as light emitting device 102 of FIG. 1 having operational characteristics other than that of the above cited range (e.g., emitting a focused light at wavelengths different than those mentioned above). In this situation, appropriate dyes may be added to the fluid 110 to alter or extend the operational range at which results may be obtained. In other words, adding the dyes will change the wavelength that is needed to heat the fluid 110 to the phase critical temperature of the stimuli responsive polymer. For example, if a red laser is to be used then a green dye might be selected and added to the flowing fluid 110. Then the process continues as described above, where heating of the fluid 110 at a selected location results in a phase change in the stimuli responsive polymer resulting in a visible spot and/or streak as previously described. In adding dyes, it would be common to select a dye that is appropriate for the operational characteristics of a selected light emitting device (e.g., laser). Dyes may also be used to avoid and/or minimize absorption of the emitted light by the material used to construct the flow channel 108.

While the above discussion has focused on the carrier liquid being water, and therefore the fluid flow being transparent, it is to be appreciated the present concepts are also applicable when the carrier liquid of fluid 110 is something other than water, and not transparent. In the situation where the carrier liquid is not transparent, then similar to when dyes are added to the transparent fluid, the light emitting device (laser) that is selected will need to be matched to the spectral characteristics of the non-transparent carrier fluid so the stimuli responsive polymer will be heated to its critical temperature.

The liquid (dissolved) nature of the stimuli responsive polymer allows it to follow streamlines very well; thereby establishing a vector at the location of the flow field. Also in the present embodiment in which a transparent liquid is within the fluid channel an infrared laser is employed.

Figure 3:
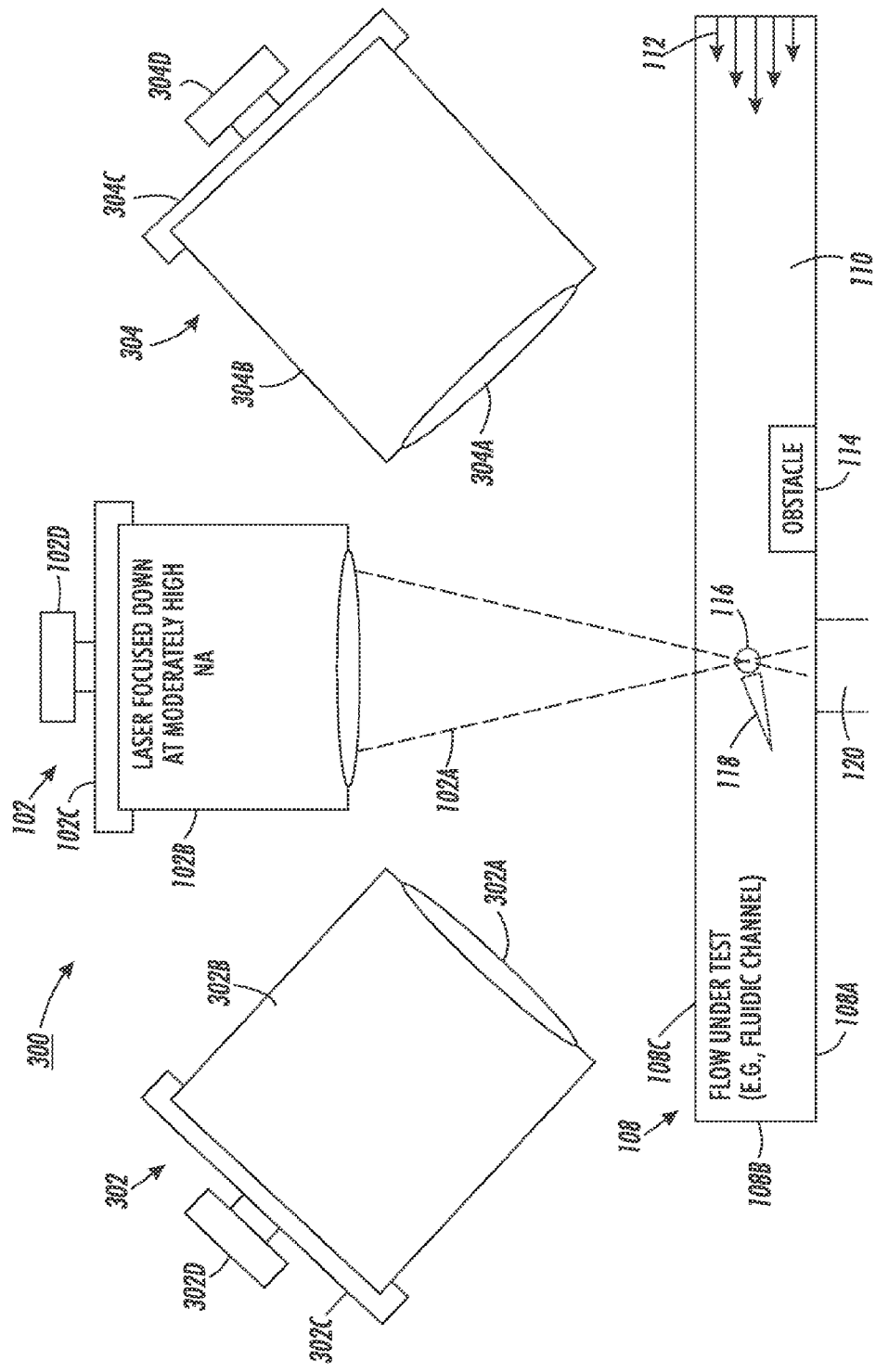
FIG. 3 is another embodiment of a system incorporating the presently described concepts.

The system illustrated in FIG. 1, is understood to be just one embodiment in which the present concepts may be implemented. For example while FIG. 1 shows the use of a single camera 106b in the image recording system 106 and beam splitter 104, in other embodiments a beam splitter may be removed and multiple cameras may be employed. One such system is shown in FIG. 3 as a system 300, which depicts the use of the present concepts employing multiple image recording systems 304 and 306. These systems include lenses 302a, 304a, cameras 302b, 304b, movable bases 302c, 304c, and base controllers 302d, 304d similar to those discussed in connection with FIG. 1. For convenience image recording systems 302 and 304 are depicted on opposite sides of light emitting arrangement 102, however it is to be appreciated these image recording arrangements 302, 304 may be moved, such as to be located 90 degrees from each other to perform certain three dimensional (3D) image recording operations. Also, while two image recording arrangements 302, 304 are shown, it is again to be understood that FIG. 3 is intended to represent the use of multiple image recording arrangements.

Thus the present description describes that one or multiple cameras placed around fluid channel 108 is/are used to record appearance and dynamic behavior of the generated streaks inside the fluid channel 108. The streak's orientation and therefore the orientation of the flow vector is directly visible from the recorded imagery. The velocity of the flow correlating to the streak's length (before thermal conduction spreads and acts to reverse the phase-change, such as by a cooling of the stimuli responsive polymer). It is of course to be appreciated that velocity of the flow is also influenced by several other factors (heat capacity, conductivity, turbulence, etc. . . . ). Therefore a time-resolved measurement with a pulsed light source (e.g., light emitting devices 102b, 302b, and 304b) may be employed, where the developing streak's length is observed as it grows allowing the streamline velocity to be inferred. It is also understood if the properties of the liquid are known then it is possible to calculate the velocity by knowing the length of the streak developed over a time period. Thus using the present concepts both an orientation and velocity of fluid flow is determinable by review of a single image.

Still further, relative velocity between streaks may be determined by comparing the length of steaks at separate locations in the fluid channel by visual interrogation. Particularly, the operations of the present concepts may be used to generate a visual streak from a first location in the fluid channel. Then the system(s) described above are moved to another location above the flow channel and the operations of the system are again used to capture a second streak image. These images are then compared to determine the relative velocity between the two streaks. Alternatively a relative velocity between two streaks may be obtained when the investigation takes place at the same location of the fluid channel when the streaks are generated at different times.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for visualization of fluid flow comprising:
providing a fluid including a mixture of a stimuli responsive polymer and carrier liquid within a fluid channel, wherein the stimuli responsive polymer and carrier liquid mixture is flowing within the fluid channel and wherein the fluid channel contains no seed particles;
emitting a focused light from a light emitting arrangement into a selected area of the fluid channel to interact with the flowing fluid mixture containing the stimuli responsive polymer and the carrier liquid;
generating a phase change in the stimuli responsive polymer by the interaction of the focused light on the stimuli responsive polymer within the fluid channel, wherein the phase change results in a portion less than the entire stimuli responsive polymer to become visible; and
recording, by use of an image recording system, at least one image of the portion of the stimuli responsive polymer that is visible.

2. The method according to claim 1 wherein the visible portion of the stimuli responsive polymer represents the direction and velocity of the flow of the fluid within the fluid channel.

3. The method according to claim 1 further including operating the light emitting arrangement to perform a 3D rasterization of the selected area of the fluid channel.

4. The method according to claim 1 wherein the stimuli responsive polymer is dissolved transparently into the carrier liquid.

5. The method according to claim 1 wherein the light emitting arrangement is controlled to create sufficient heating within the selected area of the fluid channel to cause a phase change to the stimuli responsive polymer only within the selected area.

6. The method according to claim 1 wherein the stimuli responsive polymer is an aqueous solution of an LCST polymer Poly-NiPAAM.

7. The method according to claim 1 further including adding a dye to the fluid within the fluid channel, to adjust a light absorption range of the fluid within the fluid channel.

8. The method according to claim 1 wherein an image obtained by the image recording is a streak made visible by application of the focused light to the stimuli responsive polymer of the fluid, and the orientation of the streak makes directly visible the orientation of a flow vector of the flow within the fluid channel, and the velocity of the flow correlated to a length of the streak.

9. The method according to claim 1 further providing a time-resolved measurement with a pulsed light source from the light emitting arrangement, wherein a developing length of a streak of the stimuli responsive polymer is observed as it grows over a number of recorded images from the spot to the streak, allowing an inference of streamline velocity.

10. The method according to claim 1, wherein the visible portion of the stimuli responsive polymer is initially in a form of a visible spot, and over a time period the visible spot becomes a visible streak.

11. A system for visualization of fluid flow, the system comprising:
a light emitting arrangement configured to emit a focused light;
a fluid channel configured to hold a fluid including a carrier liquid and a stimuli responsive polymer, wherein the fluid flows within the fluid channel and wherein the fluid channel contains no seed particles; and
an image recording arrangement;
wherein the light emitting arrangement is positioned to emit the focused light into a selected area of the fluid channel to interact with the flowing stimuli responsive polymer within the selected area, resulting in a phase change to a portion of the stimuli responsive polymer, and wherein the image recording arrangement is positioned to record the portion of the phase changed stimuli responsive polymer.

12. The system according to claim 11, wherein the selected area of the fluid channel is less than the entire fluid channel under investigation, and the focused light creates sufficient heating in the stimuli responsive polymer only within the selected area of the fluid channel, wherein the heating action triggers the phase change of the stimuli responsive polymer only within the selected area causing the stimuli responsive polymer to become hydrophobic, causing the stimuli responsive polymer to collapse, creating a light-scattering section that is a visible portion of the stimuli responsive polymer.

13. The system according to claim 11 wherein the light emitting arrangement is a 3D rasterizing system.

14. The system according to claim 11 wherein the selected area of the focused light illuminating the stimuli responsive polymer is between approximately 40 microns to approximately 100 microns in diameter.

15. The system according to claim 11 wherein the selected area of the focused light is approximately 50 microns in diameter.

16. The system according to claim 11 wherein the light emitting configuration is a laser configuration, generating a focused light in the form of a laser beam.

17. The system according to claim 11 wherein the stimuli responsive polymer is an aqueous solution of an LCST polymer, Poly-NiPAAM.

18. The system according to claim 11 further including a dye in the fluid within the fluid channel, to adjust a light absorption range of the fluid within the fluid channel.

19. The system according to claim 11, wherein the phase change portion of the stimuli responsive polymer becomes a visible portion of the stimuli responsive polymer initially in the form of a visible spot, and over a time period the visible spot becomes a visible streak.

20. A method for visualization of fluid flow comprising:
providing a fluid including a mixture of a stimuli responsive polymer and carrier liquid within a fluid channel, wherein the stimuli responsive polymer and carrier liquid mixture is flowing within the fluid channel and wherein the fluid channel contains no seed particles;
emitting a focused light from a light emitting arrangement into a selected area of the fluid channel to interact with the flowing fluid mixture containing the stimuli responsive polymer and the carrier liquid, wherein the selected area of the fluid channel is less than the entire fluid channel under investigation;

generating a phase change in the stimuli responsive polymer by the interaction of the focused light on the stimuli responsive polymer, wherein the focused light creates sufficient heating in the stimuli responsive polymer only within the selected area of the fluid channel, wherein the heating action triggers the phase change of the polymer only within the selected area causing the stimuli responsive polymer to become hydrophobic, creating a light-scattering section that is a visible portion of the stimuli responsive polymer; and recording, by use of an image recording system, the portion of the stimuli responsive polymer that is visible over a time period as the visible portion changes from a spot to a streak, wherein the selected area of the fluid channel is less than the area of the fluid channel being recorded by the image recording device.

\* \* \* \* \*